United States Patent [19]

Mirkarimi

[11] Patent Number: 4,569,532

[45] Date of Patent: Feb. 11, 1986

[54] INFANT CRAWLER

[76] Inventor: Seyed A. Mirkarimi, 11733 Goshen Ave., #303, Los Angeles, Calif. 90049

[21] Appl. No.: 636,820

[22] Filed: Aug. 1, 1984

[51] Int. Cl.$^4$ ............................................. B60P 3/00
[52] U.S. Cl. ........................... 280/87.02 W; 280/32.5; 297/5; 297/195
[58] Field of Search ............ 280/87.02 W, 32.5, 32.6; 297/5, 6, 195

[56] References Cited

U.S. PATENT DOCUMENTS

| | | | |
|---|---|---|---|
| 1,404,572 | 1/1922 | Bowman | 280/87.02 W |
| 1,572,273 | 2/1926 | Elton | 280/87.02 W |
| 3,532,356 | 10/1970 | Lillibridge | 280/87.02 W |
| 3,759,511 | 9/1973 | Zinkin et al. | 297/195 |
| 3,976,155 | 8/1976 | Esch | 280/32.5 |

FOREIGN PATENT DOCUMENTS 651548 11/1962 Canada ......................280/87.02 W

*Primary Examiner*—William A. Cuchlinski, Jr.

[57] ABSTRACT

An infant crawler used to assist infants in learning to walk, wherein the infant is supported by a central frame in a generally forwardly inclined position at a height whereat the infant's feet can reach the floor, so that the infant may move the crawler by pushing with its foot action. The torso of the infant is supported in a generally forwardly inclined position, so that the infant's strength and attention are not diverted from the process of learning leg and foot movement, to the necessity for supporting and coordinating the upper body. In a preferred embodiment, the central frame includes a forwardly and upwardly inclined torso support, and a rearwardly and upwardly inclined seat disposed behind the torso support. This central frame is in turn supported by four legs providing a wide base to avoid tipping, and having wheels on the ends so that the infant crawler may be pushed about by the infant. A belt is also preferably provided to fix the infant to the central frame.

17 Claims, 5 Drawing Figures

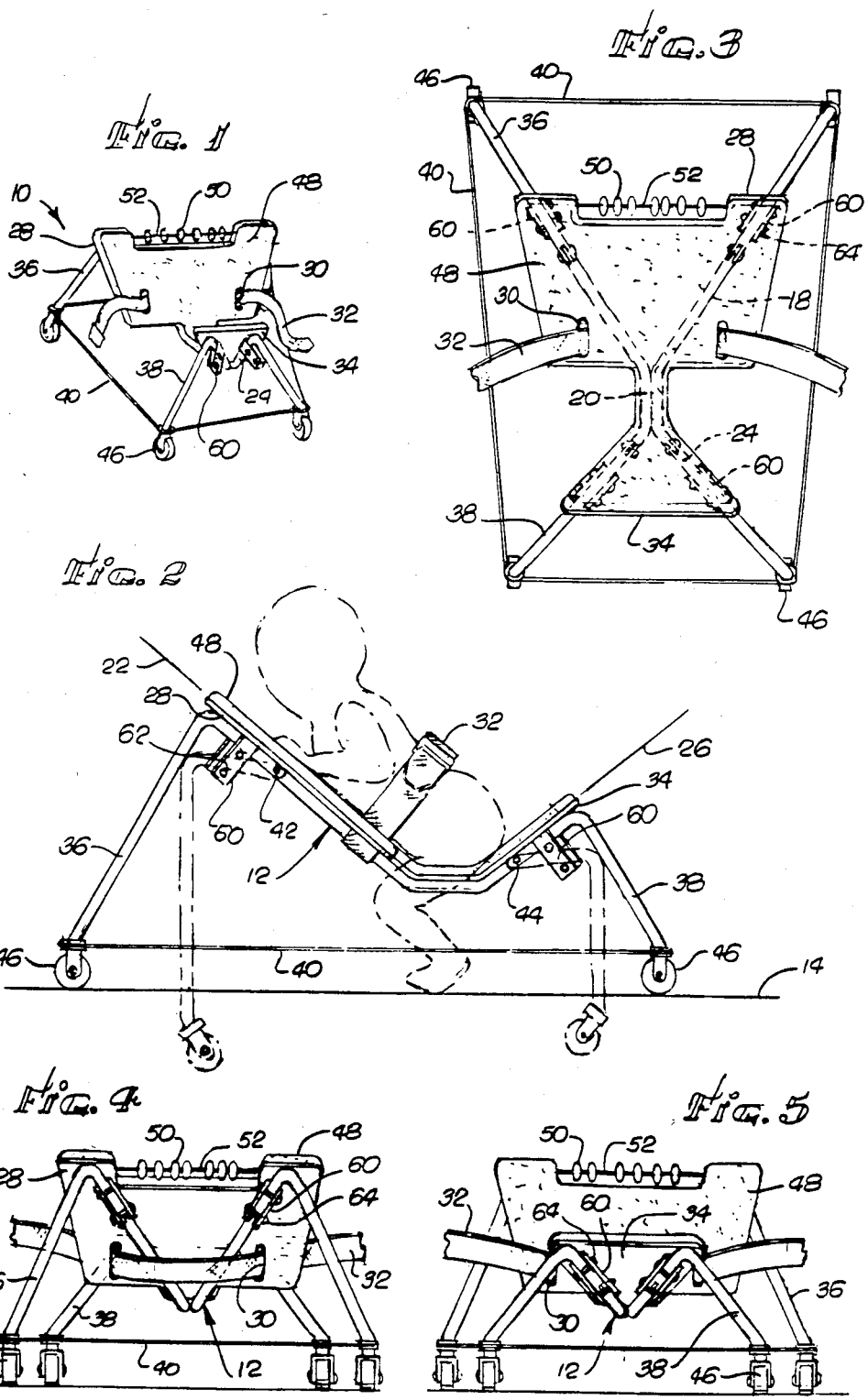

4,569,532

INFANT CRAWLER

BACKGROUND OF THE INVENTION

This invention relates generally to apparatus for assisting infants in learning to walk, and, more particularly, to an infant crawler for supporting an infant during the learning process.

Typically, unless otherwise assisted, an infant first learns to crawl and then to walk within the first 18 months of life. This development proceeds as the young child becomes stronger and more coordinated. There have been provided various types of apparatus to assist infants in the process of learning to crawl and then learning to walk. For example, infant creepers allow an infant to be placed on its stomach horizontally on a wheeled device, so that its hands and feet can reach the floor. The infant can then propel the creeper about the floor using arm and leg motion.

There are also infant walkers wherein the infant is supported in a generally upright position upon a seat within a circular frame, so that only the infant's feet can reach the floor. The infant is thereby encouraged to move the walker over the floor using only the motion of the feet. In both creepers and walkers, some or all of the infant's weight is supported by the wheeled apparatus, so that the arms and legs provide motive force and are not required to support the weight of the entire body.

However, such existing apparatus for assisting infants in learning to crawl and walk suffer from important disadvantages. In a creeper, the infant is allowed to utilize his arms for motive force, although the principal objective is eventually to teach the child to use only his legs for motive force. Also, in typical creepers, the infant must support at least its head uprightly, so as to see forwardly during the crawling motion. Apparatus wherein the infant is supported fully upright allow the infant to see where it is going, but still require the infant to support the head and also to expend its strength and attention in holding the torso upright.

The shortcomings of existing apparatus relating to the support of the head and torso are particularly important where very young infants are learning to walk. For example, a typical infant from about 2-6 months of age may lack sufficient strength and coordination to learn arm and leg movement, while at the same time attempting to hold the head or the torso upright and also avoid falling out of the apparatus. There is an increasing inclination of parents to teach such very yound children to walk, and in some cases the parents seek to teach the child to walk without first passing through the crawling stage.

There therefore exists a need for apparatus to assist very young infants in learning to walk. Such apparatus should provide the proper support for the head and torso of the infant, so that the infant may concentrate its strength and attention upon the leg movement necessary to learn walking. The apparatus should also be highly stable to prevent the infant from overturning the apparatus as it is moved about, should have provision to prevent the infant from falling out of the apparatus, and should also provide sufficient safety features so that the infant is not injured when the apparatus is propelled into fixed obstacles. The present invention fulfills this need, and further provides related advantages.

SUMMARY OF THE INVENTION

The present invention resides in an apparatus having particular utility in the teaching of very young infants to walk, wherein the infant is firmly and safely supported so that his strength and attention may be devoted to learning the mechanics of walking. The torso of the infant is fully supported in a forwardly inclined position, with the head inclined forwardly and upwardly so that the infant may easily raise its head to look about or may rest its head, as desired. The pelvis of the infant is supported in the frame so that the legs extend downwardly to contact the floor and be moved by the infant to propel the apparatus. The infant therefore learns the motions of walking in a position which is safe and comfortable, and does not require support of the body weight by the legs.

In accordance with the invention, an infant crawler for assisting an infant in learning to walk includes a central frame of a size suitable for carrying and supporting a young infant, the frame having a torso support including a forwardly and upwardly inclined surface, and a seat positioned rearwardly of the torso support, the torso support and the seat cooperating to support the body of the infant in a generally forwardly inclined position. The infant crawler also includes means for rollably supporting the central frame on a flat surface at a sufficient height above the ground that the feet of the infant may comfortably contact the flat surface. An infant placed in the central frame and supported thereby is thus positioned to utilize its feet in propelling the crawler in various directions without the need to support the torso, so that the infant may learn to develop walking motions in the legs while positioned in a way that is generally comfortable for infants.

In a preferred embodiment, the central frame is constructed of steel sections such as bars, channels or tubes, formed in a shape having an upwardly and forwardly inclined forward portion and an upwardly and rearwardly inclined rear portion, and a connecting link between the forward and rear portions. The forward and rear portions are preferably inclined at about 35-45 degrees to the horizontal, as it has been found that this arrangement is particularly satisfactory in supporting the infant. To the forward portion is mounted a torso support, which is a solid material such as plastic or wood and of sufficient width and height to support the torso and head of the infant thereupon. The torso support is covered with a soft surface cover such as a plastic covered foam to cushion the contact of the infant's body. A seat is mounted to the rear part of the central frame, and is of sufficient width and height to support the buttocks and pelvis of the infant thereupon. The seat may also be covered with a soft material such as a plastic covered foam to cushion the contact of the infant's body with the frame. In this preferred embodiment, the central frame forms a saddle-like structure upon which the infant may be placed, with the infant's legs extending downwardly over the sides of the saddle arrangement.

The central frame is preferably supported by two pairs of legs extending downwardly and outwardly from the forward-most and rearward-most portions of the central frame, respectively. The legs are also formed of steel sections, and have rollers on the distal ends thereof in contact with the floor. Optionally, the legs may include hinges so that the legs may be folded when the infant crawler is not in use, to achieve a more compact structure for ease of shipping, transportation and storage. The legs preferably extend forwardly and rearwardly of the central frame, respectively, and also outwardly in each case. This outward disposition of the supporting means provides a larger wheel base for the infant crawler, so that the infant may not easily overturn the crawler. Additionally, this outward disposition of the legs tends to prevent injury to the infant in the infant crawler if the infant crawler is propelled against an object such as a wall or furniture, since the outward disposition of the legs prevents the central frame from approaching the obstacle too closely. Additionally, bumpers can be provided to further prevent contact with objects. A preferred form of bumper is a flexible line such as string or rope tied between the lower-most portions of adjacent support legs, so that objects of smaller size may not be approached closely.

It will now be appreciated from the foregoing that the infant crawler of the present invention presents an advance in the field of apparatus for assisting in the teaching of walking to infants. With the infant crawler of the present invention, an infant may be placed in a comfortable forwardly and upwardly inclined position so that the weight of the infant may be fully supported, but also so that the legs of the infant may reach the floor to propel the infant crawler by the leg motions required in unassisted walking. The infant therefore learns to move its legs in a walking movement, prior to the time that it has sufficient strength and coordination to accomplish walking on its own. The infant is generally lying face down on the support, a naturally comfortable position, but also is partly vertically oriented so that a walking movement is possible. Moreover, the infant is safely restrained in the infant crawler, which is itself highly resistant to tipping and is also constructed to protect the infant from impact against objects that are contacted by the infant crawler. The construction of the infant crawler of the present invention is also relatively simple and inexpensive. Other features and advantages of the present invention will become apparent from the following more detailed description, taken in conjunction with the accompanying drawinngs, which illustrate, by way of example, the principles of the invention.

BRIEF DESCRIPTION OF THE DRAWINGS

FIG. 1 is a perspective view of an infant crawler;

FIG. 2 is a side elevational view of the infant crawler of FIG. 1;

FIG. 3 is a top plan view of the infant crawler of FIG. 1;

FIG. 4 is a front elevational view of the infant crawler of FIG. 1; and

FIG. 5 is a back elevational view of the infant crawler of FIG. 1.

DETAILED DESCRIPTION OF THE PREFERRED EMBODIMENT

In accordance with the invention, and as illustrated in the drawings with reference to a preferred embodiment, the present invention is embodied in an infant crawler denoted by the numeral 10. The infant crawler comprises a central frame 12 and a means for rollably supporting the central frame 12 on a flat surface 14.

The central frame 12 includes a structural framework, preferably formed of metallic structural elements, to which the other parts of the infant crawler 10 are attached. The structural framework preferably includes a pair of front structural members 18, joined together at one end in a "V" shape, and attached at the joined end to a connecting link 20. The connecting link 20 is disposed in a generally horizontal orientation, while the front structural members 18 are inclined forwardly and upwardly to define a forwardly and upwardly inclined plane 22. The upward inclination of the plane 22 is preferably about 35-45 degrees, as this inclination has been demonstrated to be both comfortable for the infant and also sufficient to allow the infant to raise its head and look about as desired, to satisfy his curiosity. The infant can therefore become accustomed to associating leg movement with the visual environment.

The structural framework also includes a pair of back structural members 24 joined at one end to form a "V", and at that same end also joined to the opposite end of the connecting link 20. The back structural members 24 are inclined upwardly and rearwardly from the connecting link 20, to define a rearwardly and upwardly inclined plane 26. The length of the back structural members 24 is preferably shorter than that of the front structural members 18. When viewed in the side view of FIG. 2, the front structural members 18, connecting link 20, and back structural members 24 together define an asymmetric, flat-bottomed V-shaped structure similar to a saddle. The front structural members 18, connecting link 20, and back structural members 24 may be joined together by any suitable means, but are preferably welded to give strength to the structural framework. In an alternative construction approach, the left-side front structural member 18, connecting link 20, and back structural member 24 may be formed of a single bent piece as can the corresponding right-side element. The left and right sides can then be welded together at the connecting link 20. Reinforcing members may optionally be provided, but are not generally necessary, as the weight of the infant supported by the infant crawler 10 is typically less than 15 pounds.

An inclined support surface 28 is attached to the front structural members 18, to lie generally within the forwardly and upwardly inclined plane 22 defined by the front structural members 18. The inclined surface 28 is preferably a sheet of plastic or a wooden board which is inexpensive and easily shaped. The inclined surface 28 should be of sufficient width so that the entire upper torso of the infant is supported on the inclined surface 28. Within this constraint, the width of the inclined surface 28 may be made narrower, so that the arms of the infant extend over the sides of the inclined surface 28, or may be made broader, so that the infant cannot extend its arms over the side of the inclined surface 28. The length of the inclined surface should be sufficiently long to support the entire length of the torso of the infant. The length of the inclined surface 28 is optionally but preferably made somewhat longer than the length of the torso, so that the infant may rest its head upon the inclined surface 28.

Provision is made for restraining the infant who uses the infant crawler 10 from falling off the infant crawler 10. In the preferred embodiment, a pair of belt slots 30 are provided in the inclined surface 28, with the longest dimension of the belt slots 30 extending along the inclined length of the inclined surface 28. A belt 32 passes under the inclined surface 28 and upwardly out of the belt slots 30, whereby the infant may be strapped to the inclined surface 28 and thence to the infant crawler 10 by means of the belt 32. The infant is thereby securely restrained in the infant crawler 10, and may not fall or crawl out of the infant crawler 10. Alternatively, there may be a separate length of belt extending out of each of the belt slots 30, to belt the infant in place in the manner described.

A seat 34 is attached to the V-shaped structural element formed by the joining of the back structural members 24, and positioned so that the infant may rest its buttocks against the seat 34. Thus, when the infant is using the infant crawler 10, the buttocks of the infant are placed against the seat 34, the torso and head of the infant rest against the inclined surface 28, and the upper pelvis and abdominal regions of the infant are disposed adjacent the connecting link 20. The legs of the infant extend downwardly through the area laterally adjacent the connecting link 20, and between the back edge of the inclined surface 28 and the front edge of the seat 34.

The inclined surface 28, connecting link 20, and seat 34 are preferably covered with a soft, resilient padding material 48 on the upper surfaces contacted by the body of the infant, to cushion the contact between the structural elements of the infant crawler 10 and the body of the infant. The padding 48 is preferably formed of foam glued to the upper surfaces of the inclined surface 28, connecting link 20, and seat 34, and then covered by a strong plastic that is resistant to tearing and is easily cleaned. Alternatively, the foam need not be glued and may be held in place solely by the plastic covering.

The central frame 12 is supported above the flat surface 14, which may be a floor or the ground, by a means for rollably supporting the central frame 12. In the preferred embodiment, this means comprises two pairs of legs, a front pair 36 and a back pair 38. One of the front pair of legs 36 is attached to each of the front structural members 18 at the upwardly disposed end of the front structural member 18. Similarly, an end of one of the back pair of legs 38 is attached to each of the back structural members 24, at an upwardly disposed end of the back structural member 24. Each of the front pair of legs 36 is preferably longer than each of the back pair of legs 38, inasmuch as the front structural members 18 are longer than the back structural members 24. In any event, the front pair of legs 36 and the back pair of legs 38 must be of sufficient length that a stable four-point support of the infant crawler 10 is achieved on the flat surface 14. The legs 36 and 38, structural members 18 and 24, and connecting link 20 may be formed of any sufficiently strong material, such as steel, aluminum alloy, or plastic.

The front pair of legs 36 and the back pair of legs 38 may be generally vertically disposed, but preferably are inclined outwardly from the area of the central frame 12 projected onto the flat surface 14. As illustrated in the FIGURES, the front pair of legs 36 are preferably inclined forwardly and outwardly, and the back pair of legs 38 are preferably inclined backwardly and outwardly. This inclination of the legs provides at least two important benefits. First, the area of the wheel base of the infant crawler 10 is substantially increased as compared with the projected area of the central frame 12. The greater wheel base provides improved stability for the infant crawler 10, so that the infant cannot easily tip over the infant crawler 10. Secondly, the outward inclination of the two pairs of legs 36 and 38 creates a safety zone about the infant when the infant is properly placed into the infant crawler 10. Large objects cannot penetrate into the safety zone, nor can the infant reach beyond the bounds of the safety zone. This safety zone is defined by the projection of the greatest forward, backward, and lateral extent of the legs 36 and 38, onto the flat surface 14. As an example of the significance of this safety zone, it may be imagined that the infant pushes the infant crawler 10 forwardly until the front pair of legs 36 encounter a wall or other immovable object. If the front pair of legs 36 were not forwardly inclined, the infant could approach the wall very closely. If the infant had a particularly long torso, so that its head extended beyond the upper end of the inclined surface 28, then the infant might be injured by this headlong movement into the wall. Because the front pair of legs 36 extend forwardly, the forward motion of the infant crawler 10 is halted at a distance sufficiently far from the wall that the infant cannot contact his head to the wall. Similarly, the inclination outwardly and rearwardly also prevents impact against large immovable objects.

A bumper means may also be provided in the infant crawler 10 to protect the infant from additional types of impact injuries. As an example, and referring to FIG. 3, a post or piece of furniture might be of sufficiently small dimension that the infant could propel the infant crawler 10 against the object without ever touching either of the front pair of legs 36. In the circumstances previously described, the infant's head could then conceivably be injured by impact against the object. To minimize the possibility of such injury, the bumper means extends the safety zone to include objects having sufficiently small dimensions to pass between the legs 36 and 38 of the infant crawler 10.

Preferably, the bumper means is a bumper line 40 which extends between the two legs of the front pair of legs 36, the two legs of the back pair of legs 38, and between the adjacent one of the front pair of legs 36 and back pair of legs 38 on each side of the infant crawler 10. That is, the bumper line 40 extends completely around the perimeter defined by the outermost extent of the four legs of the infant crawler 10. The bumper line 40 is preferably made of string or rope, but could be made of wire or a rigid structural member. However, the bumper line 40 should be selected with care, to be certain that the infant cannot injure itself on the bumper line 40. The bumper line 40 is attached at or near the lower extremity of the legs 36 and 38. The bumper line 40 limits the proximity of the approach of the infant in the infant crawler 10 to fixed obstacles of relatively smaller dimension. If the infant propels the infant crawler 10 against a door jamb, for example, the body of the infant cannot contact the door jamb because of the restraining influence of the bumper line 40.

The legs 36 and 38 are attached to the respective front and back structural members 18 and 24 by any suitable means. In one embodiment, the legs 36 and 38 are welded to or bolted or screwed to, the respective front and back structural members 18 and 24. Preferably, the front pair of legs 36 are attached to their respective front structural members 18 by a pair of front hinges 42. Also preferably, the back pair of legs are attached to the back structural members 24 by a pair of back hinges 44. In this embodiment, the front hinges and back hinges are disposed to allow the legs 36 and 38 to swing inwardly toward the central frame 12 when the hinge is operated, and to swing outwardly and away from the central frame 12 when the hinges 42 and 44 are opened. In an embodiment having hinged legs, the hinges 42 and 44 may be lockable at partially folded positions so that the height above the ground of the central frame 12 may be varied. Lockable hinges can be expensive, and a preferred alternative of lower cost is illustrated. For each of the hinged legs, a pair of locking blocks 60 is attached to the underside of the inclined surface 28. Each of the locking blocks 60 has a pair of locking holes 62 therethrough, the holes 62 being oppositely disposed so that locking pins 64 may be inserted therethrough. The space between the locking pins 64 is sufficiently large tht the hinged leg fits between the inserted locking pins 64, thereby locking the leg at a partially folded position so change the height of the central frame 12 above the flat surface 14.

Hinging of the legs 36 and 38 allows the infant crawler to be more readily stored and transported when not in use. It is also possible to further hinge the legs 36 and 38 to reduce their overall length during storage or transportation. Portions of the central structural framework may also be hinged if desired, once again to make the infant crawler 10 more compact for transportation or storage. For example, in an embodiment not illustrated in the FIGURES, a hinge could be provided between the front structural members 18 and the connecting link 20 or between the back structural members 24 and the connecting link 20 to fold the structural framework to smaller size.

Wheels 46 are attached to the distal ends of the legs 36 and 38 to contact the flat surface 14. The wheels may be of any conventional type, such as rubber-tired wheels or casters utilized under furniture. The wheels may be of the axle type or of the ball and socket type, and axle type wheels may be provided with a swivel, so that the infant crawler 10 may be pushed in any direction.

The infant crawler 10 may be provided with modifications to entertain the infant or provide additional learning opportunities. For example, the inclined surface 28 may be provided with beads 50 strung on a rod 52 fastened at the upper end of the inclined surface 28 within the view and reach of the infant. Noisemakers, or light or pattern generating apparatus, can be geared to the motion of the infant crawler 10.

When the infant crawler 10 is used for its normal function, the infant is placed over the central frame 12 so that the infant's buttocks rest against the seat 34, the infant's torso rests against the inclined surface 28, and the abdomen and upper pelvis are positioned adjacent the connecting link 20. The infant is strapped to the infant crawler 10 by means of the belt 32. The infant's legs extend downwardly toward the floor on each side of the central frame 12 through the spaces defined by the lateral extent of the connecting link 20, the back edge of the inclined surface 28, and the forward edge of the seat 34. The infant may rest its head against the upper end of the inclined surface 28, and may periodically choose to raise its head so as to observe the surrounding environment. The infant can then move its legs in a walking motion to push the infant crawler 10 in any direction permitted by the wheels 46. By this movement, the infant learns to coordinate the motion of his legs with his perception of the surrounding environment and the motion of the infant crawler 10, with his full attention and strength devoted toward development of this walking motion. The infant may also rest both its torso and head against the inclined surface 28 in a generally forwardly inclined position when tired. The arms of the infant do not reach to the ground and the infant does not utilize its arms in providing motion of the infant crawler 10.

It will now be appreciated that, through the use of the infant crawler of the present invention, the infant may be assisted in learning the elements of walking movement at a very early age, at which age the infant may not have the strength and coordination to walk on his own or even when supported in a generally upright fashion in a conventional crawler. The infant crawler of the present invention is provided with extensive safety features to prevent injury to the infant. Although a particular embodiment of the invention has been described in detail for purposes of illustration, various modifications may be made without departing from the spirit and scope of the invention. Accordingly, the invention is not to be limited except by the appended claims.

I claim:

1. An infant crawler for assisting an infant in learning to walk, comprising:
   a central frame of a size suitable for carrying and supporting an infant thereupon, said central frame having a torso support means for supporting the torso of the infant, including a forwardly and upwardly inclined support surface, and a seat means rearwardly disposed from said torso support means, said inclined surface and said seat means cooperating to support the body of the infant in a generally forwardly inclined position; and
   means for rollably supporting said central frame on a flat surface at a sufficient height above the surface so that the feet of the infant may contact the flat surface, whereby the infant is positioned to utilize the feet in propelling the walker without the need to support the torso upright and without using its hands in a crawling motion.

2. The infant crawler of claim 1, wherein the forwardly and upwardly inclined support surface of said torso support means is covered with a soft padding to cushion the contact with the torso of the infant.

3. The infant crawler of claim 1, wherein the connecting link is covered with a soft padding to cushion the contact with the infant.

4. The infant crawler of claim 1, wherein the seat means is covered with a soft padding to cushion the contact with the infant.

5. The infant crawler of claim 1, wherein the forwardly and upwardly inclined support surface of said torso support surface of said torso support means is upwardly inclined at an angle of from about 35 to about 45 degrees to the horizontal.

6. The infant crawler of claim 1, wherein said torso support means and said seat means are joined by a horizontally disposed connector link, whereby said seat means is rearwardly displaced from said torso support means.

7. The infant crawler of claim 1, wherein said means for rollably supporting includes four legs joined to said central frame, each of said legs having a roller at the distal end thereof so that said infant crawler may roll on the flat surface.

8. The infant crawler of claim 7, wherein said central frame and said legs are made of steel.

9. The infant crawler of claim 7, wherein said central frame and said legs are made of plastic.

10. The infant crawler of claim 7, wherein said central frame and said legs are made of aluminum alloy.

11. The infant crawler of claim 7, further including a line strung between at least two of said legs, whereby said line prevents the infant from being injured when said infant crawler is propelled against an obstruction.

12. The infant crawler of claim 1, wherein said means for rollably supporting includes four legs joined to said central frame, at least two of said legs being joined to said central frame by hinges, each of said legs having a roller at the distal end thereof so that said infant crawler may roll on the flat surface.

13. The infant crawler of claim 12, wherein four legs are hinged, and said hinges are lockable to vary the height of the infant crawler above the ground.

14. The infant crawler of claim 1, further including means to prevent the infant from falling off said infant crawler.

15. The infant crawler of claim 1, further including a belt attached to said central frame and of sufficient length to fasten about the body of the infant, whereby the infant is prevented from falling off said infant crawler.

16. The infant crawler of claim 1, wherein said means for rollably supporting includes bumper means for preventing the infant in the infant crawler from being injured when said infant crawler is propelled against an obstruction.

17. The infant crawler of claim 1, wherein entertainment devices are attached thereto.

* * * * *